INVENTORS
PETAR PALIC
HERBERT SCHOLZ

AGENT

Jan. 31, 1967  H. SCHOLZ ETAL  3,302,025
SAMPLE CHANGER FOR RADIO-ACTIVE SAMPLES USING ENDLESS
FLEXIBLE MEANS FOR SAMPLE TRANSPORTATION
Original Filed Aug. 18, 1959  3 Sheets-Sheet 2
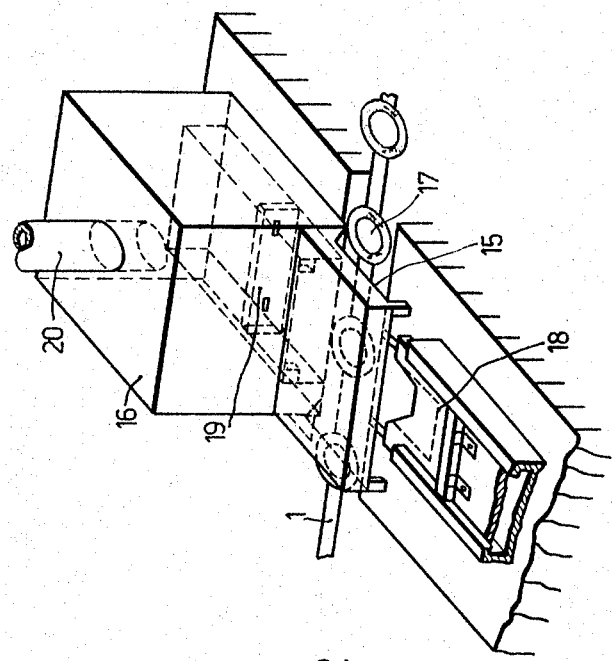
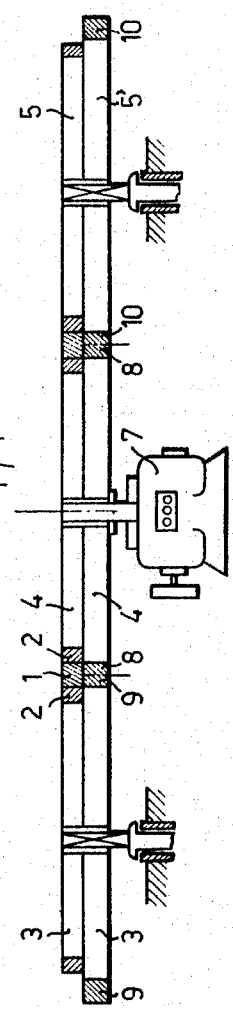
INVENTORS
PETAR PALIC
HERBERT SCHOLZ
BY
AGENT

United States Patent Office 3,302,025
Patented Jan. 31, 1967

3,302,025
SAMPLE CHANGER FOR RADIO-ACTIVE SAMPLES USING ENDLESS FLEXIBLE MEANS FOR SAMPLE TRANSPORTATION
Herbert Scholz, Hamburg, and Petar Palic, Hamburg-Lockstedt, Germany, assignors to North American Philips Company, Inc., New York, N.Y., a corporation of Delaware
Continuation of application Ser. No. 834,601, Aug. 18, 1959. This application Aug. 29, 1963, Ser. No. 306,653
Claims priority, application Germany, Aug. 29, 1958, P 21,269
8 Claims. (Cl. 250—106)

The present application is a continuation of U.S. patent application Serial No. 834,601 filed August 18, 1959, and now abandoned.

This invention relates to changers of samples for investigations in the area of radio-activity, the preparations to be tested being led successively along a radiation meter and each time remaining under the same for an adjustable period of time.

Sample changers are known in which a table with the cups for containing the samples grouped on its periphery can be turned in steps so that a preparation under investigation can be combined with a radiation meter for a certain period which is pre-determined. If desired, the time during which the sample remains under the radiation meter may also be deduced from counts. The necessary controls and mechanical manipulations are comparatively complicated, since it is always necessary to ensure that the preparation being tested is substantially shielded with respect to the surroundings and is not influenced by adjacent preparations. Consequently, in addition to the transportation movements further movements of the preparation cups into the shielding chamber are necessary.

The novel sample changer, which is characterized by a driven endless chain or system of chains as a transportation means and accommodation for receiving the preparation cups and lifting them in steps from the chain and the supply of the cups into the shielding chamber containing the radiation meter, may be much simpler of construction and much easier to handle in operation, since the chain and the preparation cups can move between stationary parts of the device. Furthermore, more preparations than in conventional sample changers can be housed in the same space and on the same surface.

Figure 1:
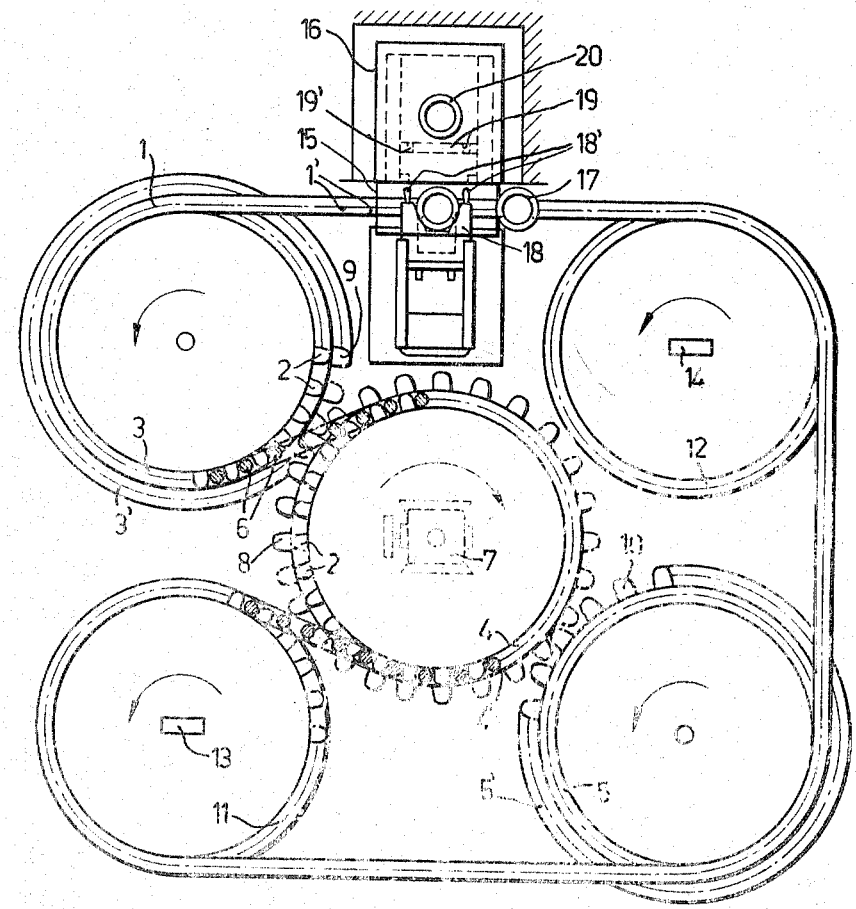
Figure 4:
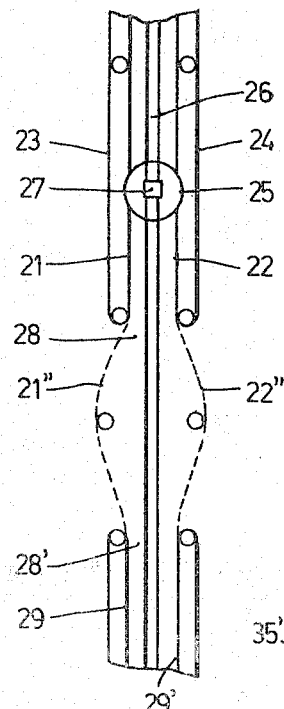
Figure 5:
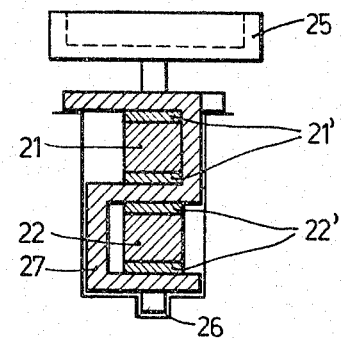
Figure 6:
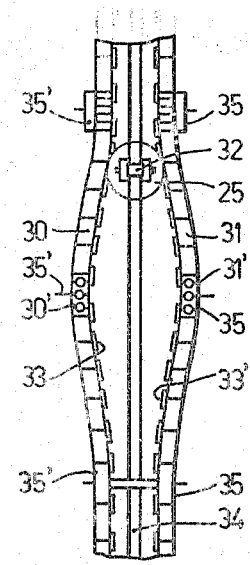
Figure 7:
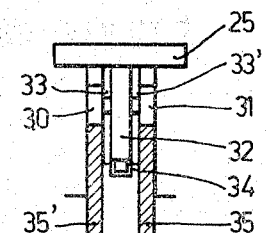

In order that the invention may be readily carried into effect, several embodiments will now be described, in detail, by way of example, with reference to the accompanying drawings, in which:

FIG. 1 shows a chain guide for the samples;
FIG. 2 is a diagrammatic view with a shielding chamber and,
FIG. 3 shows the driving device for the embodiments of FIG. 1.
FIGS. 4 and 5 are a plan and sectional view respectively of an alternative embodiment of the present invention and
FIGS. 6 and 7 are a plan and sectional view respectively of another alternative embodiment thereof.

Referring now to FIG. 1, an endless articulate chain or flexible belt, which may alternatively be of synthetic material, comes between junction rods 6 of chain 1 by meshing of the teeth 2 of double gear wheels 3, 4, 5 and 3', 4', 5' respectively. The gear wheel 4, which is driven by an electric motor 7 as a function of the count, meshes via the teeth 8, 9 and 8, 10 respectively, without play with the gear wheels 3 and 5, while chain 1 is laid on the teeth 2 of the gear wheels 3, 4, 5. Guide wheels 11 and 12, which rotate freely, are fitted, preferably with a slight possibility of displacement for the shafts in slot guides 13 and 14 to enable any play occurring in the chain to be eliminated.

The chain 1 is led through a front chamber 15 of a shielding chamber 16, preferably of lead, as may be seen from FIG. 2. The preparation cups 17 may be secured to chain 1 either by clamping or in other suitable manner.

After the preparation cup 17 has arrived in front chamber 15 and the feed movement of chain 1 has ceased, an electric motor sets in known manner a rectilinearly-guided supply member 18 into movement which embraces the cup in a bifurcated manner, lifts it from the chain and slides it into shielding chamber 16. The cups may be positioned as a close fit in small depressions of the chain, from which they are pushed out by the supply member 18 and an opposite member 19 during their movement into shielding chamber 16. The cup is replaced onto the chain after measurement.

Over the preparation cups is radiation meter or detector 20, to which a counter or the like is connected in known manner. The spacing between the preparation cups on the chain may readily be matched with the movement of the chain, so that in the case of stepwise control of driving motor 7 each cup arrives exactly in front chamber 15. Step-switching relays or continuous drives may be used as controlled driving motors, the latter being provided with ratchet devices in order to ensure the superposition of each cup individually.

The invention is not limited to the embodiment shown. It is alternatively possible, for example, for two chains to be introduced side by side, in steps, into separate front chambers for separate shielding chambers containing separate radiation meters. In this case, the guide for the chain drive must of course, be such that the measurements do not overlap.

The bifurcated supply member 18 has small springs 18' which can bear in apertures 19' of the opposite member 19 so that the opposite member, which serves for the proper transportation of the cups, is taken along to stops 16' in the guide of shielding chamber 16. The supply member returns to its stop whereas the cup remains on the chain, which is ensured by corresponding projections 1' on the chain. Next, the chain moves on one step and a new cup is introduced into shielding chamber 16.

A chain may alternatively be shortened or lengthened by removing or adding chain links. It is also possible for portion of the chain, including the preparation cups, to be led into a longer shielding channel on each side of front chamber 15, which is likewise shielded.

As a further alternative, the chain guide may be chosen differently by the addition of further driving wheels or guide wheels, it being essential only that the endless chain should be introduced into the front chamber substantially in a straight line.

For very sensitive measurements it is readily possible to provide a lock which is coupled to the drive for the chain, so that a cup present in the front chamber is already wholly shielded from the surroundings. In this embodiment, the radiation meter may sometimes be arranged in the front chamber and the feed movement provided in a separate shielded chamber. The lock surfaces located on the side above the chain are not filled until the cup is moved on, to be closed again as soon as a new cup is in the proper position under the radiation meter.

It is also possible to control the supply member by means of the same electric motor which drives the chain, if a correspondingly controlled coupling is provided.

In this embodiment, it would be possible to dispense with a separate motor for supplying the cup into the shielding chamber proper containing the radiation meter.

For the transportation of the sample cups, it is alternatively possible to use two chain paths 21 and 22 of two chains 23 and 24, which are located side by side or one above the other, as shown diagrammatically in FIGS. 4 and 5. In this case, a guide member 27 guided in a guide gutter 26 is associated with each sample cup and, in the case of chains located one above the other, for example, a hook-like member (FIG. 5) which may be clamped on the end surfaces 21' and 22' and which is driven by the two parallel-guided chain paths as long as the chain paths 21, 22 and 21', 22' of guide gutter 26 are parallel. The cup 25 may then be enclosed either in the course of the parallel-guided chain paths or at the end in shielded chambers containing the radiation meters, end 28 of the parallel guide. After measurement, the guide member 27 may again be picked up at 28, by two further chain paths 29 and 29' or by the re-joined chain paths 21", 22".

In another embodiment as shown in FIGS. 6 and 7, chains 30 and 31 having ball joints 30', 31' are located side by side with a guide member 32 having a cup 25 which is clamped for example, between the end walls 33, 33' of the chains. The guide member 32 slides into a guide gutter 34 and the chains driven by rollers 35, 35' serve to move on the cups. Due to the ball joints in the chains, guiding of the chains along slightly curved paths is also readily possible so that again juxtaposed closed chain paths may be obtained, the rollers 35, 35' in contradistinction to the embodiment of FIG. 4 being journalled in the plane of the drawing. At the area where the guide member 32 with its cup must be introduced into the shielded measuring chamber, the chains 30 and 31 slightly move apart as the guide member 32 moves through the measuring chamber. After having been moved out of the measuring chamber, the guide member 32 is brought onto the chains 30 and 31, which then again operates closely side by side and provides for the further transportation of the cups.

What we claim:

1. A sample changer for radioactive samples employed with a detector comprising a plurality of sample holders, a shielding chamber containing said detector, an endless flexible belt for transporting said samples to be tested successively adjacent the operating area of said detector, means for driving said endless flexible belt, and means for engaging said sample holders and moving the same from said endless flexible belt to deposit each sample holder into said shielding chamber containing said detector.

2. A sample changer for radioactive samples employed with a radiation meter comprising a plurality of sample holders, a shielding chamber containing said radiation meter, a chain system for transporting said samples to be tested successively within the operating range of said radiation meter, means for driving said chain system, and means for engaging said sample holders and lifting the same from said chain system to deposit each sample holder into said shielding chamber containing said radiation meter.

3. A sample changer for radioactive samples employed with a radiation meter comprising a plurality of sample holders, a shielding chamber containing said radiation meter, an endless chain system for transporting said samples to be tested successively within the operating range of said radiation meter, means for driving said chain system including a plurality of gear wheels with interengaging teeth, and a bifurcated member for engaging and lifting said sample holders from said chain and transporting them into said shielding chamber and returning said sample holders on said chain after measurement by said radiation meter.

4. A sample changer for radioactive samples employed with a radiation meter comprising a plurality of sample holders, a shielding chamber containing said radiation meter, a chain system for transporting said samples to be tested successively within the operating range of said radiation meter, a double gear wheel drive having interengaging guide wheels, said double gear wheel drive meshing with the chain links of said chain system and said guide wheels for driving said chain system, and means for engaging said sample holders and lifting the same from said chain system to deposit each sample holder into said shielding chamber containing said radiation meter.

5. A sample changer for radioactive samples employed with a radiation meter as claimed in claim 2 wherein said chain system includes at least two separate chains, each having separate sample holders thereon.

6. A sample changer for radioactive samples employed with a radiation meter as claimed in claim 5 wherein said two separate chains are located side-by-side.

7. A sample changer for radioactive samples employed with a radiation meter comprising a plurality of sample holders, a shielding chamber containing said radiation meter, a chain system having spaced depressions therein for holding and transporting said sample holders, said chain system having guide tracks and guide members movable therein, said samples being tested successively within the operating range of said radiation meter, a double gear wheel means for driving said chain system, and means for engaging said sample holders and lifting the same from the spaced depressions in said chain system to deposit each sample holder into said shielding chamber containing said radiation meter.

8. A sample changer for radioactive samples employed with a radiation meter as claimed in claim 2 wherein said chains are provided with ball joints.

References Cited by the Examiner

UNITED STATES PATENTS 2,500,492    3/1950    Henriques _____ 250—106 X

OTHER REFERENCES

Demorest et al.: Automatic Sample Changer for Well-Type Scintillation Counter, from Nucleonics, volume 12, No. 7, July 1954, pages 68 and 69.

RALPH G. NILSON, *Primary Examiner.*

ARCHIE R. BORCHELT, *Examiner.*